(12) United States Patent
Beck et al.

(10) Patent No.: US 6,223,649 B1
(45) Date of Patent: May 1, 2001

(54) PISTON-CYLINDER UNIT

(75) Inventors: Hubert Beck, Eitorf; Matthias Molitor, Windeck, both of (DE)

(73) Assignee: Mannesmann Sachs AG, Eitorf (DE)

( * ) Notice: Subject to any disclaimer, the term of this patent is extended or adjusted under 35 U.S.C. 154(b) by 0 days.

(21) Appl. No.: 09/425,455

(22) Filed: Oct. 22, 1999

(30) Foreign Application Priority Data

Oct. 23, 1998 (DE) .............................. 198 48 798

(51) Int. Cl.⁷ .................. F01B 31/00; F16J 1/10
(52) U.S. Cl. ................................ 92/109; 92/129
(58) Field of Search ............... 92/109, 116, 129

(56) References Cited

U.S. PATENT DOCUMENTS

| | | | |
|---|---|---|---|
| 1,390,078 | * 9/1921 | Blain | 92/116 X |
| 3,424,062 | * 1/1969 | Gummer et al. | 92/129 X |
| 3,951,046 | * 4/1976 | Lochmann et al. | 92/109 X |
| 4,628,795 | * 12/1986 | Pickard et al. | 92/109 X |

FOREIGN PATENT DOCUMENTS

677900 * 8/1952 (GB) ............................. 92/109

* cited by examiner

*Primary Examiner*—John E. Ryznic
(74) *Attorney, Agent, or Firm*—Cohen, Pontani, Lieberman & Pavane

(57) ABSTRACT

A piston/cylinder unit includes a working cylinder, a piston attached to a piston rod and arranged so that it is axially movable in the working cylinder, and a fastening element threaded into a threaded bore of the piston rod. The bore in the piston rod includes a tapered surface which widens outward starting from the diameter of the thread and the fastening element has a corresponding diminishing tapered surface arranged on a collar which diminishes from the outside to the diameter of the thread.

7 Claims, 4 Drawing Sheets

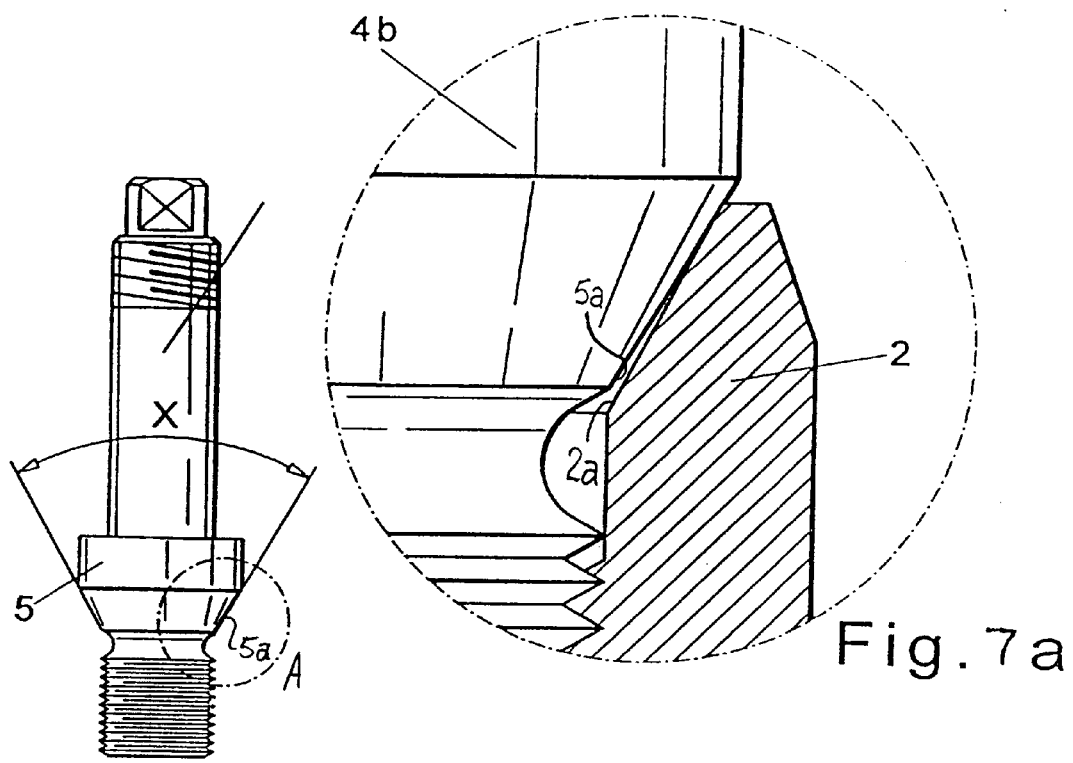
Fig. 6a
Fig. 7a
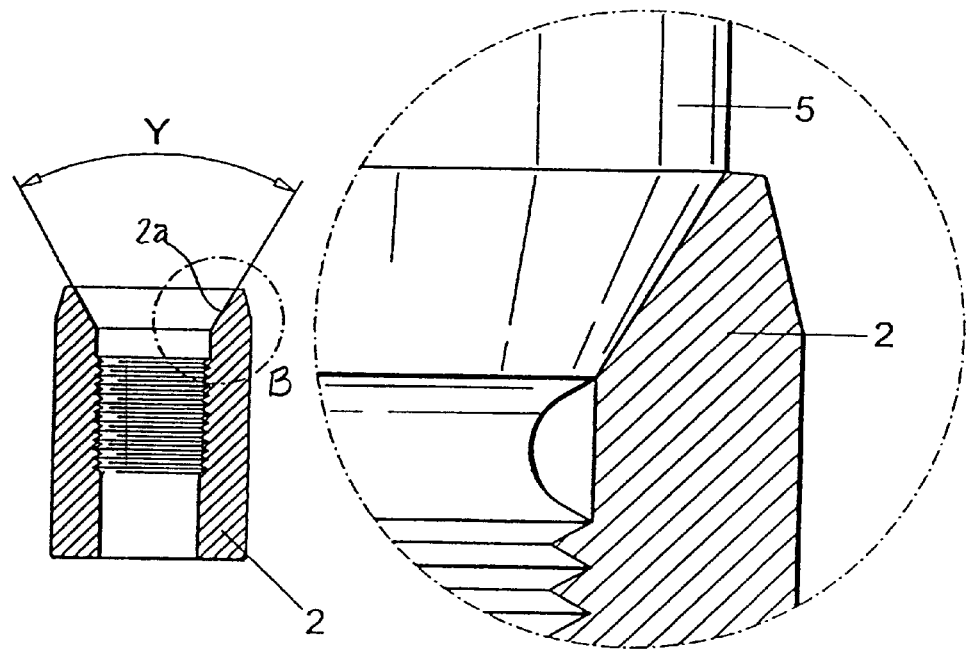
Fig. 6b
Fig. 7b

PISTON-CYLINDER UNIT

BACKGROUND OF THE INVENTION

1. Field of the Invention

The invention relates to a piston/cylinder unit comprising a working cylinder, a piston attached to a piston rod and arranged in the working cylinder so that it is axially displaceable in the working cylinder, and a fastening element screwed into a threaded bore of the piston rod.

2. Description of the Related Art

Prior art piston/cylinder units, e.g. self-pumping hydropneumatic spring struts with internal leveling, are disclosed, for example, in German reference DE 33 16 069A1 in which a tubular piston rod is closed at its outer end by a screw-in bolt. The screw-in bolt has an offset which is pressed onto the end of the piston rod by the torque applied to the threaded joint. This type of piston-rod closure offers the advantage of allowing different screw-in bolts to be threaded into the piston rod so that the same piston rod can be used with many different screw-in bolts. This threaded joint is designed principally for transmitting forces in the axial direction, that is to say for elements constructed as axle dampers (shock absorbers).

The disadvantage with these embodiments is that, when these piston/cylinder units are used in spring struts, the screw-in bolts of the piston rod are exposed to bending loads at different wheel locations. Therefore, the screw-in bolts must accept the bending loads. The bending strength of a spring strut of this kind is dependent on the contact pressure on the end of the piston rod, said contact pressure being generated by the torque. Tests in the field have shown that, because the contact-pressure surface is at right angles to the center line, the threaded joint either loosens or, the screw-in bolt may shear off at this point.

SUMMARY OF THE INVENTION

It is the object of the invention to attach fastening elements to a piston rod of a piston/cylinder unit such that axial forces and dynamic bending loads may be transmitted by the joint with sufficient reliability.

According to the invention, this object is achieved by a bore in the piston rod which widens from the diameter of the thread to a first outer diameter thereby creating a first tapered surface and a corresponding collar on the fastening element which diminishes from a second outer diameter to the diameter of the thread thereby creating a second tapered surface.

The advantage with this design is that the first and second tapered surfaces enable the joint to be made with a high pressure per unit area, thus allowing the two parts to be connected firmly to one another.

According to a further refinement, the widening bore of the piston rod is of conical design.

According to another feature, the tapering collar of the fastening element is also conical.

According to a particularly preferred embodiment, the fastening element, the collar and the bolt having the thread are of one-piece design.

To obtain satisfactory sealing of the cavity in the piston rod when a hollow piston rod is used, a further embodiment includes a fastening element which closes the cavity in the piston rod in a pressure-tight manner. It is advantageous here if at least one optional seal is arranged between the cavity in the piston rod and the fastening element.

According to a particularly preferred embodiment, the widening tapered surface of the piston rod and the diminishing tapered surface of the collar are provided with angles of different sizes. The collar of the fastening element and the end region of the piston rod both have a conically shaped contact-pressure surface, wherein the angle of taper of the collar being slightly greater than the angle of taper of the piston rod. This facilitates automatic centering of the fastening element and the piston rod. Furthermore, the difference in angle ensures a high pressure per unit area at the end of the piston rod at all times and thus provides a rigid connection between the two parts.

The various features of novelty which characterize the invention are pointed out with particularity in the claims annexed to and formiing a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the drawings, wherein like reference characters denote similar elements throughout the several views:

FIG. 6a is a longitudinal cross-sectional view of a fastening element according to the present invention show an angle of taper on a collar;

FIG. 6b is a longitudinal section of an end of a piston rod according to the present invention showing an angle of taper on a widening in an end region of the piston rod;

FIG. 7a is a detailed view of the areas A and B of FIGS. 6a and 6b showing the collar of the fastening element and the widening of the end region of the piston rod;

FIG. 7b is a detailed view of the areas A and B of FIGS. 6a and 6b showing the collar of the fastening element fully inserted in the end region of the piston rod.

DETAILED DESCRIPTION OF THE PRESENTLY PREFERRED EMBODIMENTS

Figures 1, 2:
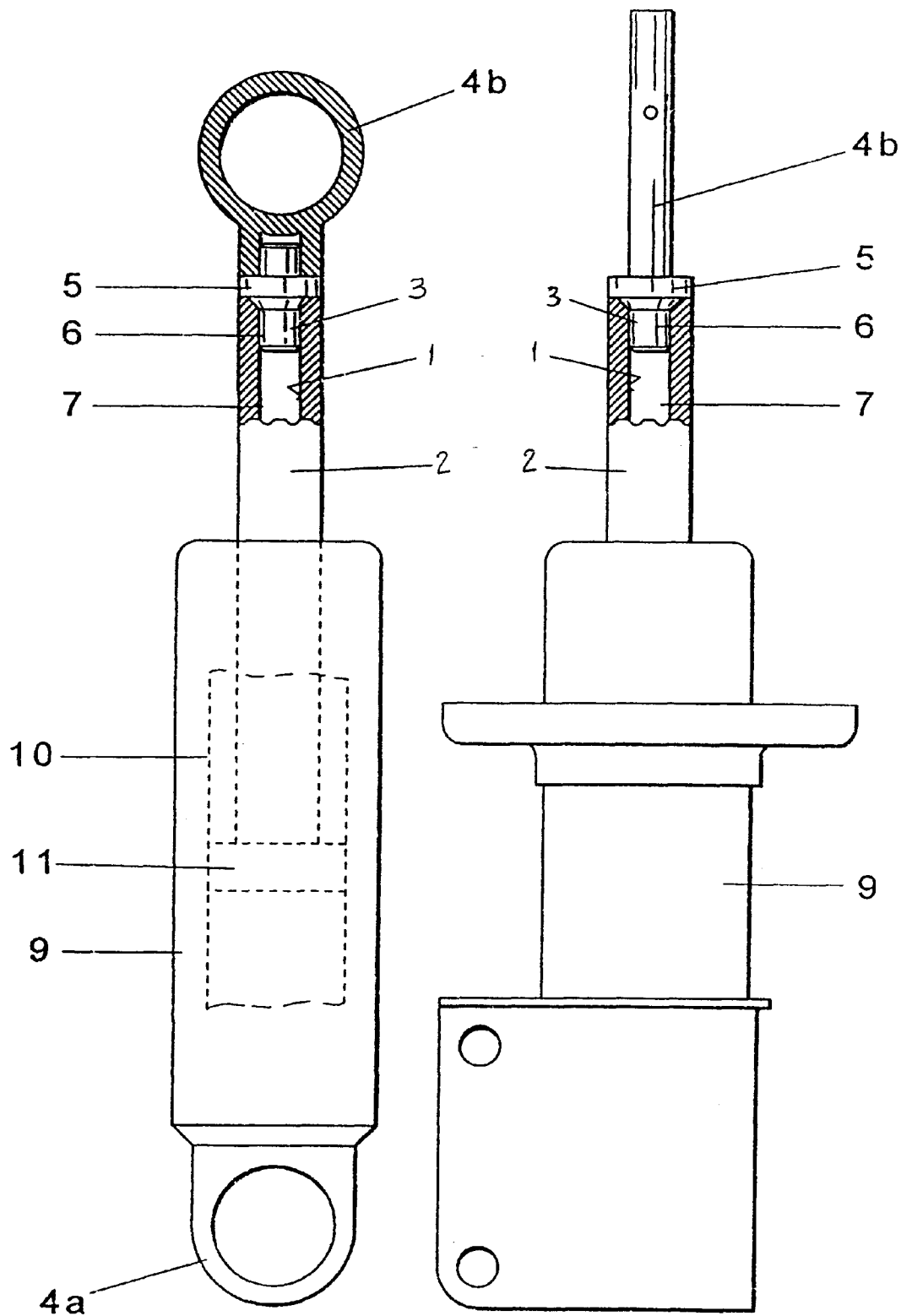
FIG. 1 is a partial cutaway view showing a piston/cylinder unit according to an embodiment of the present invention in the form of an axle damper.
FIG. 2 is a partial cutaway view showing a piston/cylinder unit according to another embodiment of the present invention in the form of a wheel-locating spring strut.

A piston/cylinder unit 100 according to an embodiment of the present invention is illustrated in FIG. 1 as a shock absorber comprising an outer tube 9 with a working cylinder 10 arranged therein. A piston 11 fastened to a piston rod 2 is arranged in the working cylinder 10 with the piston rod 2 so that the piston 11 is axially movable. A fastening element 4*a* is connected directly to the outer tube 9 and a fastening element 4b is connected to the piston rod 2 via a bolt 6 with a thread 3. The fastening element 4b also includes a collar 5 with a tapered surface which tapers from an outer diameter toward the thread 3 of the bolt 6. The piston rod 2 is of a hollow design and has a bore 1 in a cavity 7. The bore has a tapered widening surface into which the tapered surface of the collar 5 engages.

FIG. 2 shows another embodiment of the piston/cylinder unit 101 according to the present invention as a spring strut. In this embodiment, the piston/cylinder unit is likewise provided with an outer tube 9 and a piston rod 2 carrying a fastening element 4b by the thread 3. The tapered surface on a collar 5 and widening surface on the end of the piston rod 2 are also present in this embodiment. The joint between the fastening element 4b and the piston rod 2 is in principle the same as that illustrated in FIG. 1.

Figures 3, 4, 5:
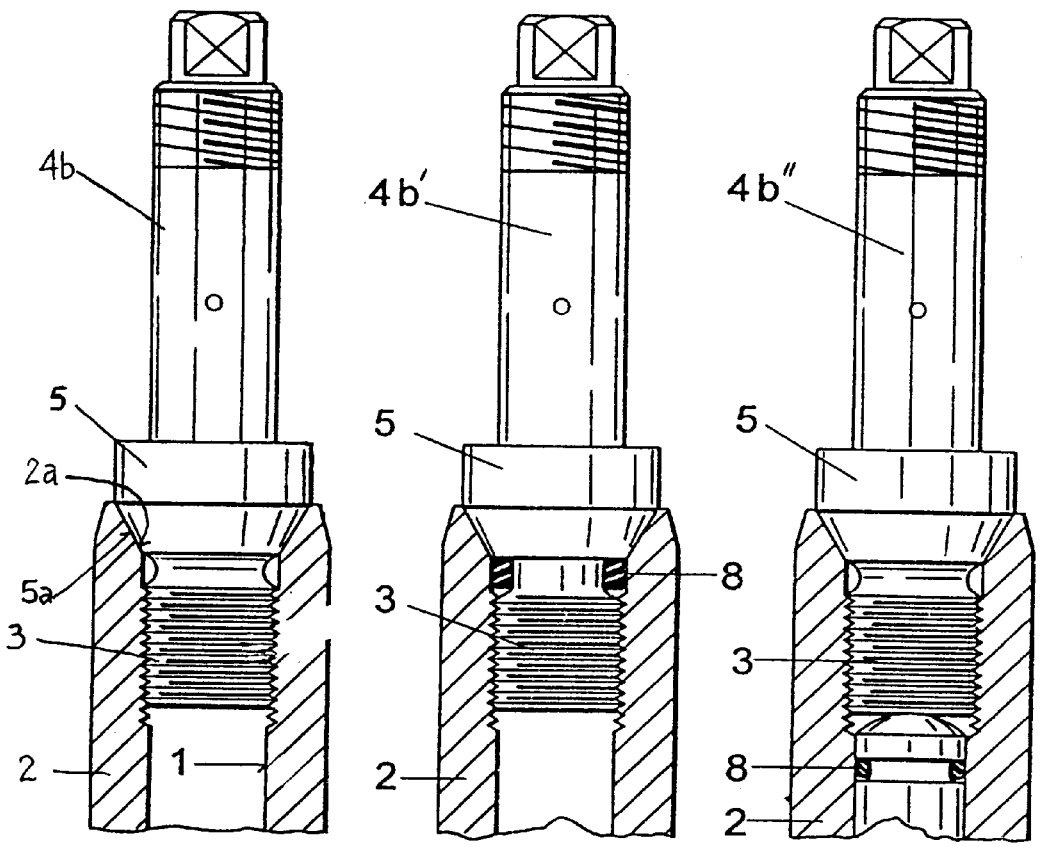
FIG. 3 is a longitudinal cross-sectional view showing a fastening element inserted in a piston rod according to an embodiment of the present invention.
FIG. 4 is a longitudinal cross-sectional view showing a fastening element inserted in a piston rod according to another embodiment of the present invention.
FIG. 5 is a longitudinal cross-sectional view showing a fastening element inserted in a piston rod according to another embodiment of the present invention.

FIG. 3 shows the end region of the piston rod 2 and the end region of the fastening element 4b in more detail. The tapered surface 5a of the collar 5 tapers radially inward as far as an outer circumference of the thread 3 while the bore 1 of the piston rod 2 has a widening tapered surface 2a that widens from the circumference of the bore 1 outward in the end region of the piston rod. The tapered surfaces 2a and 5a comprises annular surfaces such that the tapered surfaces 2a and 5a each comprise a conical design. As a result, the tapered surface 5a of the collar 5 contacts at least a circumferential line in the widening tapered surface 2a of the piston rod 2 when the fastening element 4b is threaded into the bore 1.

FIG. 4 shows another embodiment of a fastening element 4b' with a seal 8 arranged between the collar 5 and the bore 1 of the piston rod 2 to ensure pressure-tightness.

FIG. 5 shows a further embodiment of the fastening element 4b'' in which the seal 8 is part of a valve.

The view of the fastening element 4b with the collar 5 in FIG. 6a illustrates that the tapered surface 5a of the collar 5 has an angle of taper X. FIG. 6b shows the end region of the piston rod 2 and illustrates that the widening tapered surface 2a of the piston rod 2 has an angle of taper Y.

FIG. 7a shows the fastening element of FIG. 6a inserted into the piston rod 2 of FIG. 6b until the point at which the tapered surface 5a of the collar 5 abuts the widening tapered surface 2a of the piston rod 2. This illustrates that the angle X of the tapered surface 5a of the collar 5 is slightly greater than the angle Y of the widening tapered surface 2a of the piston rod 2. The enlarged detail of FIG. 7a shows clearly that the difference between the angle X and the angle Y ensures automatic centering because the contact pressure assumes its highest value in the end region of the piston rod 2 when the collar is fully inserted into the piston rod as shown in FIG. 7b. In the fully inserted position, the widest portion of the widening tapered surface, i.e., the area closest to the end of the piston rod 2, is urged outward by the wider tapered surface 5a of the collar 5. The surface pressure of the collar 5 in the end region of the tapered surface 2a ensures a sealing effect with respect to moisture so that the thread 3 in the bore 1 is not exposed to any environmental effects. In a manner similar to a spring washer, the restoring force of the end region of the tapered surface 2a also secures the thread against loosening. The automatic centering and the high pressure per unit area at the end of the piston rod 2 at all times which result from the tapered surfaces 2a and 5a having slightly different angles thus ensures that the fastening element 4b and piston rod 2 are connected firmly to one another.

Figure 8:
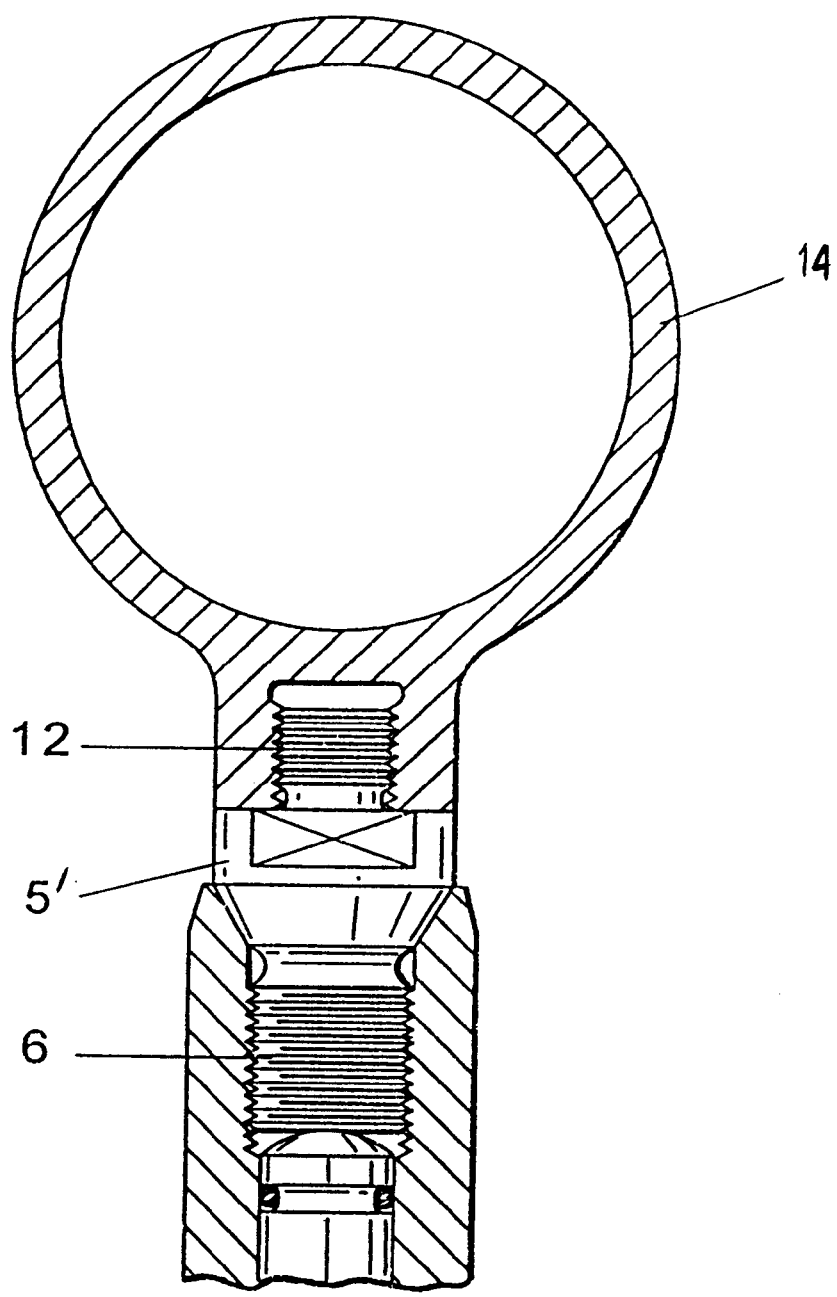
FIG. 8 is a longitudinal sectional view showing another embodiment of a fastening element together with a piston rod.

FIG. 8 shows another embodiment in which a fastening element 14 is connected to the collar 5 of a bolt 6 by a threaded joint 12. However, the fastening element 14 may equally be of one-piece design with the collar 5.

The invention is not limited by the embodiments described above which are presented as examples only but can be modified in various ways within the scope of protection defined by the appended patent claims.

We claim:

1. A piston/cylinder unit, comprising:

a working cylinder;

a piston axially movably arranged in said working cylinder and connected to a first end of a piston rod, said piston rod having a free end opposing said first end and having a threaded bore; and a fastening element having a bolt threaded into said threaded bore and having a collar with a diminishing tapered surface facing said piston rod, wherein an end region of said threaded bore comprises a widening tapered surface starting from a diameter of said threaded bore corresponding to and facing said diminishing tapered surface of said collar.

2. The piston/cylinder unit of claim 1, wherein said widening tapered surface of said piston rod comprises a conical design.

3. The piston/cylinder unit of claim 1, wherein said diminishing tapered surface of said collar comprises a conical design.

4. The piston/cylinder unit of claim 1, wherein said fastening element including said collar and said bolt comprises a one-piece design.

5. The piston/cylinder unit of claim 1, wherein said piston rod comprises a hollow piston rod having a cavity and said fastening element closes said cavity via a pressure tight connection between said fastening element and said piston rod when said belt of said fastening element is threaded into said threaded bore.

6. The piston/cylinder unit of claim 5, further comprising at least one seal arranged between said cavity and said fastening element.

7. The piston/cylinder unit of claim 1, wherein said widening tapered surface of said piston rod comprises a first angle of taper and said diminishing tapered surface of said collar comprises a second angle of taper, said first angle of taper being a different size from said second angle of taper.

* * * * *